US005894330A

United States Patent [19]
Huang et al.

[11] Patent Number: 5,894,330
[45] Date of Patent: Apr. 13, 1999

[54] ADAPTIVE ANTI-FLICKER METHOD FOR VGA TO TV DATA CONVERSION

[75] Inventors: Chien-Hsiu Huang, TaiNan; Ching-Mei Huang, MiaoLi, both of Taiwan

[73] Assignee: Silicon Integrated Systems Corp., Hsinchu, Taiwan

[21] Appl. No.: 08/787,861

[22] Filed: Jan. 23, 1997

[51] Int. Cl.[6] .................................. H04N 7/01; H04N 5/21
[52] U.S. Cl. ........................... 348/447; 348/622; 348/625
[58] Field of Search ................................ 348/447, 622, 348/625, 627, 683, 611, 614, 606, 607, 618, 619, 910; 382/260, 261, 262, 263, 264, 265; H04N 7/01, 5/21

[56] References Cited

U.S. PATENT DOCUMENTS

| | | | |
|---|---|---|---|
| 4,701,793 | 10/1987 | den Hollander et al. | 348/447 |
| 5,291,280 | 3/1994 | Faroudja et al. | 348/447 |
| 5,510,843 | 4/1996 | Keene et al. | 348/446 |
| 5,642,170 | 6/1997 | Hackett et al. | 348/447 |
| 5,708,480 | 1/1998 | Bramba et al. | 348/447 |
| 5,742,349 | 4/1998 | Choi et al. | 348/447 |
| 5,754,246 | 5/1998 | Flannaghan | 348/447 |

*Primary Examiner*—Nathan Flynn
*Assistant Examiner*—Vivek Srivastava

[57] ABSTRACT

An adaptive anti-flicker data conversion system for converting picture data in a video graphic adapter for displaying on a television. The conversion system reduces flickers adaptively according to the luminance of a pixel and neighboring pixels one line above and below. Contrast difference and mean value are defined based on the luminance of three neighboring pixels. A contrast ratio is computed by dividing the contrast difference by the mean value. Three threshold values are defined for examining the contrast ratio and selecting an appropriate anti-flicker filter. Pixels having higher contrast ratio are processed with filters having stronger anti-flicker effect. The adaptive anti-flicker method reduces flickers without blurring every pixel in the picture data.

6 Claims, 4 Drawing Sheets

| Y0(0) | Y0(1) | ............ |

FIG 2

| Y1(0) | Y1(1) | Y1(2) | Y1(3) | ............ |
| U1(0) | U1(1) | U1(2) | U1(3) | ............ |
| V1(0) | V1(1) | V1(2) | V1(3) | ............ |

FIG 3

| Y0(0) | | Y0(1) | | ............ |
| Y1(0) | Y1(1) | Y1(2) | Y1(3) | ............ |
| U1(0) | U1(1) | U1(2) | U1(3) | ............ |
| V1(0) | V1(1) | V1(2) | V1(3) | ............ |
| Y2(0) | | Y2(1) | | ............ |

ADAPTIVE ANTI-FLICKER METHOD FOR VGA TO TV DATA CONVERSION

FIELD OF THE INVENTION

The present invention relates to the conversion of picture data in a video graphic adapter (VGA) for displaying on a television, more specifically to an anti-flicker method of conversion for reducing the flickers in the displayed TV pictures.

BACKGROUND OF THE INVENTION

As personal computers go multi-media, many electronics companies try to redefine the computers as home entertainment centers. In the coming years, personal computers may gradually merge with televisions. Displaying picture data generated by a computer on a television with both high quality and good resolution is an important issue that many computer manufacturers are working to resolve.

Traditionally, the picture data generated by a computer system are stored in a VGA card in an RGB format before being displayed. The format used in a television system is, however, either YIQ for NTSC standard or YUV for PAL standard. Conversion in the format is required if the data are displayed on a television. When the picture data from a computer are displayed on a television, flickers that are not only annoying but also harmful to human eyes often occur due to the fact that only every other line is displayed.

The flickers are, generally, the consequence of undersampling effect introduced during the conversion of computer picture data to television picture data. One approach to reducing the flickers is to apply a low-pass filter to the picture data after the format conversion and before the data are displayed. This approach blurs the whole picture data. Therefore, the pictures displayed on a television may have less flickers but their resolution is also greatly reduced throughout the whole pictures due to the blurring effect. The quality of the pictures shown on the television is degraded.

SUMMARY OF THE INVENTION

The present invention has been made to overcome the above-mentioned drawback and to improve the quality of the picture displayed on a television by a computer. The primary object of this invention is to provide a method for reducing the flickers by adaptively processing the picture data during the data conversion. Another object of this invention is to provide an adaptive anti-flicker method that renders television pictures with both high quality and good resolution.

The adaptive anti-flicker method used in the present invention selectively processes pixels in the picture with different low-pass filters according to the contrast between adjacent lines. Based on three pixel values in a local neighboring area of adjacent three lines, a contrast ratio representing the contrast difference to the pixel mean value for a given pixel is computed. The contrast ratio determines how a given pixel should be rendered for display.

In the present invention, four anti-flicker filters are used for reducing flickers with different level of strength. Each filter computes a weighted sum of the three pixel values in the adjacent three lines. Three thresholds values are compared with the contrast ratio in order to select the anti-flicker with appropriate level of reducing the flicker. The higher the contrast ratio is, the more the weights of neighboring pixels are.

BRIEF DESCRIPTION OF THE DRAWINGS

FIG. 2 shows the luminance data of every other pixel of a picture line that is not displayed on a television.

FIG. 3 shows both the luminance and chrominance data of every pixel of a picture line that is displayed on a television.

FIG. 4 shows data of three consecutive picture lines used in the adaptive anti-flicker method of the invention, including a picture line to be displayed and the undisplayed picture lines above and below.

FIG. 5 shows the data of FIG. 4 being stored linearly in the line buffer of this invention.

DETAILED DESCRIPTION OF THE PREFERRED EMBODIMENTS

Figure 1:
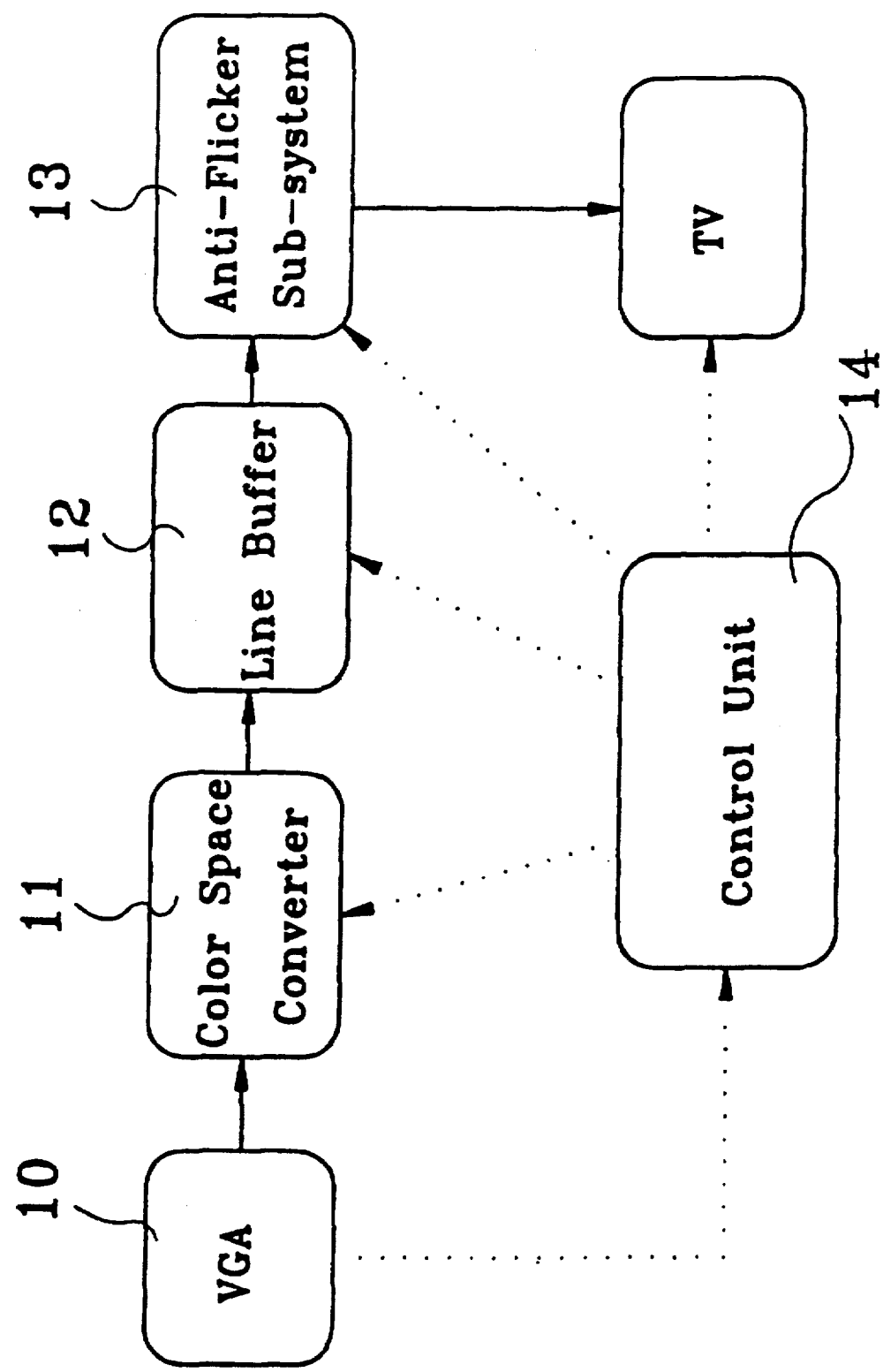
FIG. 1 shows a block diagram of the preferred embodiment of the adaptive anti-flicker data conversion system of this invention.

FIG. 1 shows the block diagram of the preferred embodiment of the data conversion system of this invention for converting VGA data into television data. The system comprises a VGA card 10, a color space converter 11, a line buffer 12, an anti-flicker sub-system 13 and a control unit 14. The adaptive anti-flicker method of the present invention is implemented in the anti-flicker sub-system 13. As shown in FIG. 1, the solid lines illustrate the data flows in the system and the dotted lines indicate the control signals.

The picture data generated by the computer are stored in an RGB format in the VGA card 10. The picture data are converted to either a YIQ or a YUV format for NTSC or PAL standard in the color space converter 11. After conversion, the data are read into the line buffer 12. The converted picture data comprise both luminance and chrominance data. Because picture data of every other line are displayed on the television, both luminance and chrominance data of the displayed lines have to be stored in the line buffer 12. The luminance data of the remaining lines that are not displayed are also stored in the line buffer 12 because the adaptive anti-flicker method of this invention only uses luminance data for reducing flickers.

According to the structure of the line buffer of this invention, some storage space in the line buffer is saved by storing only luminance data for picture lines that are not displayed. To further save the storage space, the invention uses and stores only the luminance data of every other pixel for picture lines not to be displayed. In other words, only the data of one pixel are read into the line buffer 12 during two pixel clock periods. FIG. 2 shows an example of the stored luminance data for a picture line that are used to reduce the flickers but not displayed on the television. Y0(0), Y0(1), Y0(2), . . . stand for the luminance data of the 0th, 2nd, 4th, . . . pixel of the 0th line respectively. FIG. 3 shows an example of the stored luminance and chrominance data for a picture line that is displayed on the television. Y1(0), U1(0), and V1(0) represent the luminance and chrominance data of the 0th pixel of the 1st line. The data of every pixel on the displayed picture line are stored.

For a given pixel that will be displayed, the anti-flicker method of this invention considers the corresponding pixels on both the adjacent upper and lower lines in order to determine how the pixel should be displayed. FIG. 4 illustrates the stored data of three adjacent lines to be processed by the adaptive method of this invention. Each column shows a group of data read into the line buffer 12 during two pixel clock periods. The line buffer stores the group of data sequentially as shown in FIG. 5.

Figure 6:
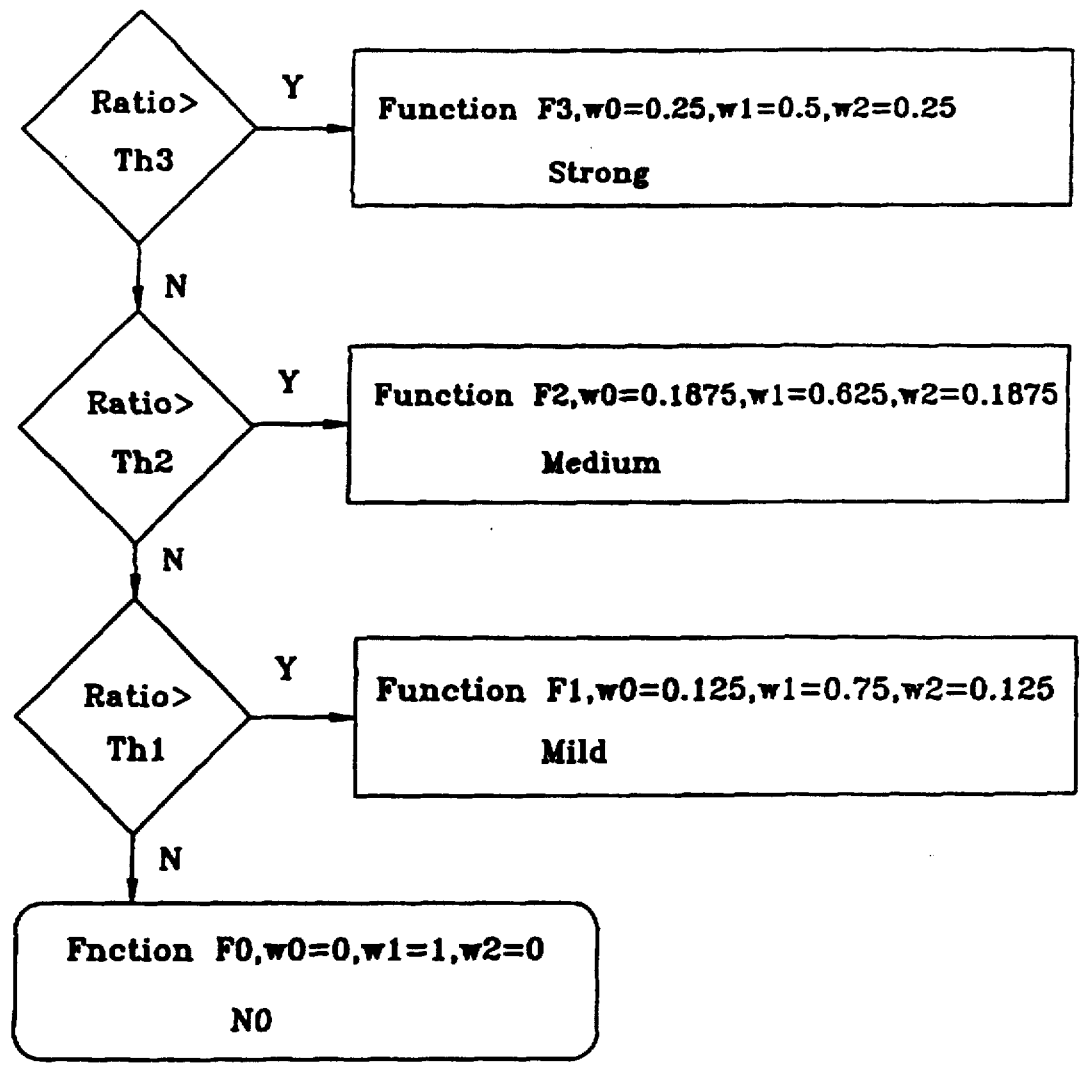
FIG. 6 shows the flow chart of the adaptive anti-flicker method of this invention.

For each pixel clock, a group of eight data as illustrated in FIG. 5 are used in the adaptive anti-flicker method. The flow chart of the method of this invention is shown in FIG. 6. Assuming that the ith pixel of the 1st line is going through the anti-flicker processing, a contrast difference for the pixel is defined as $$Diff(i)=ABS(Y1(i)-Y0(i/2))+ABS(Y1(i)-Y2(i/2)),$$

where $Y1(i)$ is the current ith pixel luminance value, $Y0(i/2)$ and $Y2(i/2)$ are the neighboring pixel luminance values of the adjacent upper and lower lines respectively. ABS stands for the absolute value. A mean value for the ith pixel is defined as $$Mean(i)=Y1(i)+0.5*Y0(i/2)+0.5*Y2(i/2).$$

It is important to note that the i/2th values of the adjacent lines are used because only the luminance data of every other pixel are stored as discussed earlier. If i is not an even number, then the truncated integer of i/2 should be used as the index. Further more, if the storage space of the line buffer is not a concern, the luminance data of every pixel of the picture lines that are not displayed can all be stored in the line buffer. Under the circumstance, the ith values of the adjacent lines $Y0(i)$ and $Y2(i)$ can be used in computing Diff(i) and Mean(i).

The contrast ratio of the ith pixel is defined as $$Ratio(i)=Diff(i)/Mean(i)$$

if Mean (i) is not zero. The value zero is assigned to the contrast ratio if Mean (i) of the current ith pixel is zero.

According to the method of this invention, the filter function for the anti-flicker processing is defined as $$Fn(Y0(i/2),Y1(i),Y2(i/2))=w0*Y0(i/2)+w1*Y1(i)+w2*Y2(i/2),$$

where n=0, 1, 2, or 3 and w0, w1, and w2 are filter weightings. The weightings w0, w1, and w2 are chosen differently for F0, F1, F2 and F3. Three threshold values Th1, Th2, and Th3 are defined for comparing with the contrast ratio to determine which adaptive anti-flicker filter function should be executed for the ith pixel.

The preferred value of the threshold Th1 ranges from 0.03 to 0.3, Th2 from 0.32 to 0.45, and Th3 from 0.48 to 1.0. For convenie of further explanation for the function in detail, typical values of the three thresholds are selected as 0.25, 0.375, and 0.5, respectively. If the contrast ratio is greater than Th3, the filter function F3 which has a stronger anti-flicker effect should be used for processing the pixel. The filter weightings are w0=0.25, w1=0.5 and w2=0.25 for F3. It can be seen that Y1(i) is weighted with a smaller weighting w1 and the neighboring pixels Y0(i/2) and Y2(i/2) are highly weighted to reduce the flicker. If the contrast ratio is smaller than Th1, the anti-flicker operation is not executed to avoid blurring the pixel. In this case, the filter function F0 having w0=0, w1=1. and w2=0. is used. For pixels with contrast ratio between 0.25 and 0.375, the filter function F1 with weightings w0=0.125, w1=0.75 and w2=0.125 is used. If the contrast ratio is between 0.375 and 0.5, the filter function F2 having w0=0.1875, w1=0.625 and w2=0.1875 is used.

According to the adaptive anti-flicker method of this invention, the current pixel is less weighted and the neighboring pixels on the adjacent lines are highly weighted to reduce the flicker when the contrast ratio is high. Because each pixel to be displayed is processed adaptively to determine how much anti-flicker effect should be imposed, the method of this invention achieves very good anti-flicker effect without blurring pixels that do not need anti-flicker operations.

Figure 7:
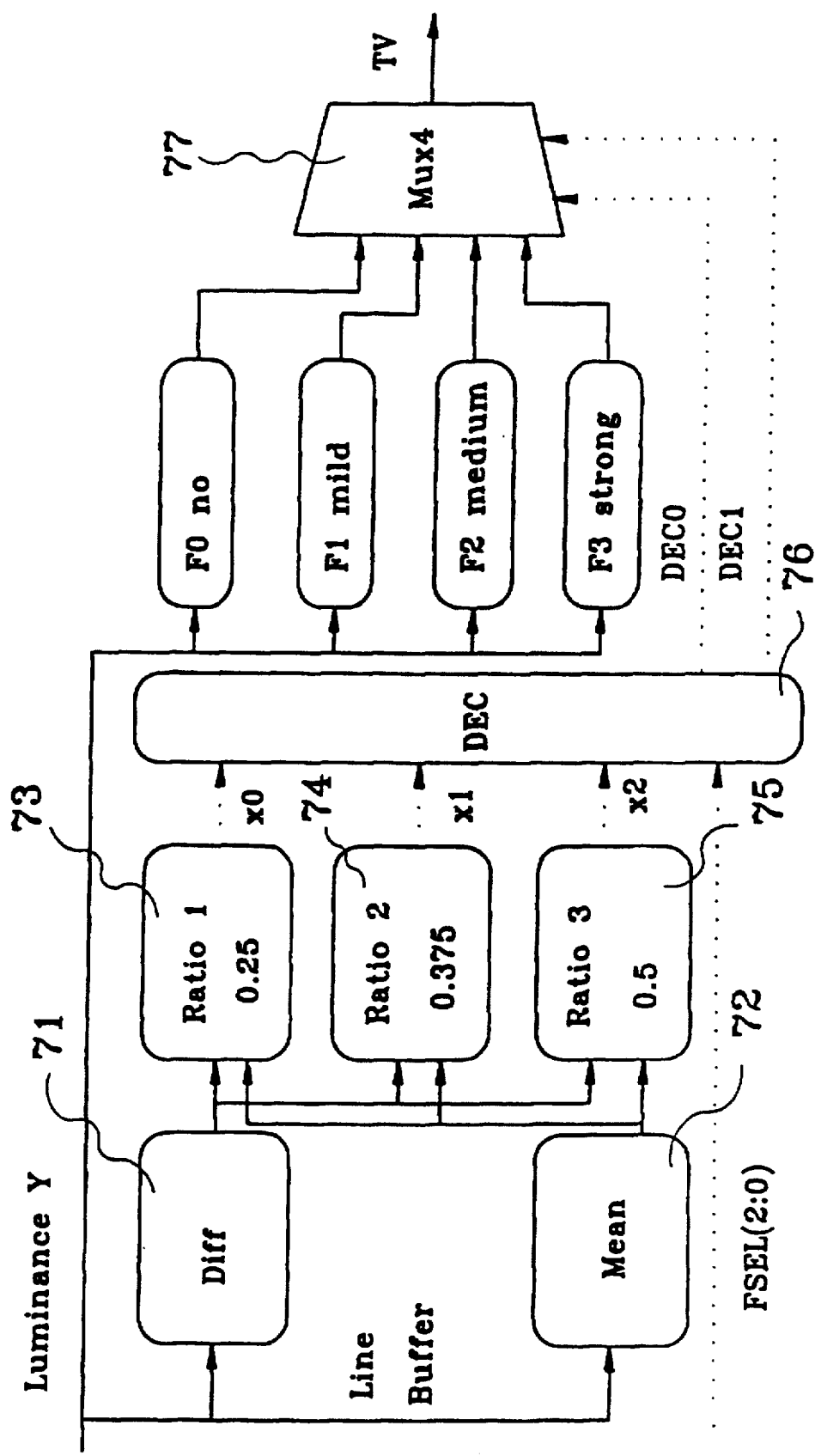
FIG. 7 shows the block diagram of the anti-flicker sub-system that implements the adaptive anti-flicker method of this invention.

The method described above and illustrated in FIG. 6 is implemented in the anti-flicker sub-system 13 of FIG. 1. FIG. 7 shows the block diagram of the hardware implementation for the sub-system. The computation of the contrast difference and the mean value is performed in DIFF 71 and MEAN 72 blocks of FIG. 7 respectively. Although the contrast ratio as defined requires a division to compute, it is not implemented directly with a division operation to avoid the complexity of a division. Because the contrast ratio has to be compared with the threshold values in order to determine which anti-filter function should be used, each threshold value is multiplied by the mean value and then compared with the contrast difference to obtain equivalent comparison result.

As shown in FIG. 7, the three blocks RATIO1 73, RATIO2 74 and RATIO3 75 perform the multiplication and comparison operations described above for threshold values Th1, Th2 and Th3 respectively. The computation of multiplication can be accomplished with a few simple shifts and adds because the threshold values are simple fraction numbers. Three outputs X0, X1 and X2 are generated by the three blocks respectively as shown in FIG. 7. The combined 3-bit value X2X1X0 is sent to a decision block DEC 76 to generate two signals DEC0 and DEC1 for selecting an appropriate filter function for the anti-flicker operation.

Four filter functions F0, F1, F2 and F3 are used for different levels of anti-flicker processing. A multiplexer MUX 77 controlled by the two signals DEC0 and DEC1 selects which filter to use. In addition, a 3-bit control signal FSEL is used to control if the adaptive anti-flicker method of this invention will be used. When the most significant bit of FSEL is 1, the adaptive method of the invention is enabled. If the mostsignificant bit of FSEL is set to 0, the conventional anti-flicker method is enabled and the lower two bits of FSEL choose F0, F1, F2 or F3 for the desired level of anti-flicker processing.

What is claimed is:

1. An adaptive anti-flicker data conversion method for converting picture data stored in a video graphic adapter for displaying on a television, said picture data having a plurality of picture lines comprising a plurality of pixels having pixel data in an RGB format, and said data conversion method comprising the steps of:

a. converting the pixel data of every pixel of every picture line of said picture data from the RGB format to a YIQ or YUV format, each converted pixel data comprising luminance and chrominance data;

b. storing both luminance and chrominance data of every pixel of every picture line of said picture data in a line buffer;

c. and processing the converted pixel data of every pixel of every other picture line of said picture data for displaying on the television according to the procedure comprising the steps of d1. to d7.:

d1. identifying the pixel being processed as a first pixel, the upper neighboring pixel on the next preceding picture line as a second pixel, and the lower neighboring pixel on the next following picture line as a third pixel;

d2. determining a contrast difference, said contrast difference being the summation of the absolute value of the difference between the luminance data of said first pixel and said second pixel and the absolute value of the difference between the luminance data of said first pixel and said third pixel;

d3. determining a mean value, said mean value being obtained by summing the luminance data of said first pixel, one half of the luminance data of said second pixel, and one half of the luminance data of said third pixel;

d4. dividing said contrast difference by said mean value to obtain a contrast ratio if said mean value is not zero and assigning zero for the contrast ratio if said mean value is zero;

d5. comparing said contrast ratio with a plurality of threshold values, said threshold values defining a plurality of flicker levels, each of said flicker levels having a corresponding anti-flicker filter for computing the weighted sum of the luminance data of said first, second and third pixels;

d6. determining the flicker level of said contrast ratio and selecting its corresponding anti-flicker filter based on the comparison result of step g.; and d7. generating new pixel data for the pixel being processed using the selected anti-flicker filter.

2. The adaptive anti-flicker data conversion method according to claim 1, wherein the step of b. is replaced by the step of:

storing both luminance and chrominance data of every pixel of every other picture line of said picture data and storing only luminance data of every other pixel of the remaining picture lines of said picture data in a line buffer, said every other picture line being prepared for displaying; and the step of d1. is replaced by the step of:

identifying the pixel being processed as a first pixel, the upper neighboring pixel or its preceding pixel on the next preceding picture line above as a second pixel, and the lower neighboring pixel or its preceding pixel on the next following picture line as a third pixel.

3. The adaptive anti-flicker data conversion method according to claim 1, wherein the plurality of threshold values comprise three threshold valuesiFthe first threshold value from 0.03 to 0.3, the second threshold value ranges from 0.32 to 0.45, and the third threshold value ranges 0.48 to 1.0.

4. An adaptive anti-flicker data conversion system for converting picture data stored in a video graphic adapter for displaying on a television, said picture data having a plurality of picture lines comprising a plurality of pixels having pixel data in an RGB format, and said data conversion system comprising:

a color space converter for converting the pixel data of every pixel of every picture line of said picture data from the RGB format to a YIQ or YUV format, each converted pixel data comprising luminance and chrominance data;

a line buffer for storing both luminance and chrominance data of every pixel of every picture line of said picture data;

an adaptive anti-flicker sub-system for processing the converted pixel data of every pixel of every other picture line of said picture data for displaying on the television, said anti-flicker sub-system comprising:

a plurality of registers storing the pixel being processed as a first pixel, the upper neighboring pixel on the next preceding picture line as a second pixel, and the lower neighboring pixel on the next following picture line as a third pixel;

a contrast difference generator for determining a contrast difference, said contrast difference being the summation of the absolute value of the difference between the luminance data of said first pixel and said second pixel and the absolute value of the difference between the luminance data of said first pixel and said third pixel;

a mean generator for determining a mean value, said mean value being obtained by summing the luminance data of said first pixel, one half of the luminance data of said second pixel, and one half of the luminance data of said third pixel;

a first ratio comparator for determining if the ratio of said contrast difference to said mean value is greater than a first threshold value and generating a first comparison bit;

a second ratio comparator for determining if the ratio of said contrast difference to said mean value is greater than a second threshold value and generating a second comparison bit;

a third ratio comparator for determining if the ratio of said contrast difference to said mean value is greater than a third threshold value and generating a third comparison bit;

first, second, third, and fourth anti-flicker filters for performing weighted sum of the luminance data of said first, second and third pixels; and a decision block accepting said first, second, and third comparison bits as well as a 3-bit selection signal, wherein said decision block selects one of said filters according to the value of said comparison bits if the most significant bit of said selection signal is set to 1, or selects one of said filters based on the lower two bits of said selection signal if the most significant bit of said selection signal is set to zero;

wherein the filter selected from said first, second, third and fourth filters reduces flicker for picture data displayed on the television;

and a control unit controlling the operation of said color space converter, said line buffer and said anti-flicker sub-system for converting the picture data in said video graphic adapter for displaying on said television.

5. The adaptive anti-flicker data conversion system according to claim 4, wherein said line buffer stores both luminance and chrominance data of every pixel of every picture line of said picture data and stores only luminance data of every other pixel of the remaining picture lines of said picture data, said every other picture line being prepared for displaying, and the plurality of registers of said anti-flicker sub-system is further replaced by:

a plurality of registers storing the pixel being processed as a first pixel, the upper neighboring pixel or its preceding pixel on the next preceding picture line above as a second pixel, and the lower neighboring pixel or its preceding pixel on the next following picture line as a third pixel.

6. The adaptive anti-flicker data conversion system according to claim 5, wherein said first, second, third threshold values are 0.25, 0.375, and 0.5 respectively.

* * * * *